(12) United States Patent  
Nasu

(10) Patent No.: US 9,424,223 B2  
(45) Date of Patent: Aug. 23, 2016

(54) TIGHTLY COUPLED MULTIPROCESSOR SYSTEM

(71) Applicant: NEC Corporation, Minato-ku, Tokyo (JP)

(72) Inventor: Yasuyuki Nasu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 486 days.

(21) Appl. No.: 13/910,282

(22) Filed: Jun. 5, 2013

(65) Prior Publication Data

US 2013/0332640 A1    Dec. 12, 2013

(30) Foreign Application Priority Data

Jun. 8, 2012    (JP) ................................ 2012-130428

(51) Int. Cl.
*H05K 7/10*    (2006.01)
*G06F 13/28*    (2006.01)
*G06F 13/36*    (2006.01)
*G06F 13/40*    (2006.01)

(52) U.S. Cl.
CPC .................................. *G06F 13/409* (2013.01)

(58) Field of Classification Search
CPC ........... H04L 12/4625; H04L 12/4637; H04L 49/30; G06F 15/78; G06F 15/7825; G06F 9/3877; G06F 12/1081
USPC .............................. 710/22, 27, 301, 306, 308
See application file for complete search history.

(56) References Cited

U.S. PATENT DOCUMENTS

| | | | | |
|---|---|---|---|---|
| 5,371,860 A | * | 12/1994 | Mura | .................... G06F 9/3879 710/22 |
| 6,272,533 B1 | * | 8/2001 | Browne | .................. G06F 21/82 709/213 |
| 6,854,025 B2 | * | 2/2005 | Knight | .................... G06F 13/28 709/209 |
| 7,383,412 B1 | * | 6/2008 | Diard | ........................ G06F 9/52 711/170 |
| 2009/0287857 A1 | * | 11/2009 | Vu | .......................... G06F 13/28 710/22 |
| 2011/0225297 A1 | | 9/2011 | Archer et al. | |
| 2011/0292058 A1 | * | 12/2011 | Herr | .......................... G06T 1/60 345/520 |
| 2012/0216015 A1 | * | 8/2012 | Mitra | .................... G06F 9/4552 712/28 |
| 2013/0086315 A1 | * | 4/2013 | Kim | ........................ G06F 13/28 711/105 |

FOREIGN PATENT DOCUMENTS

| | | |
|---|---|---|
| JP | H08-287025 A | 11/1996 |
| JP | 2005-500592 A | 1/2005 |
| JP | 2009-520307 A | 5/2009 |
| JP | 2010-272066 A | 12/2010 |
| JP | 2011-516950 A | 5/2011 |
| JP | 2012-063953 A | 3/2012 |

OTHER PUBLICATIONS

Japanese Office Action for JP Application No. 2012-130428 mailed on Mar. 8, 2016.

* cited by examiner

*Primary Examiner* — Faisal M Zaman

(57) ABSTRACT

The tightly coupled multiprocessor system includes a plurality of main processors. The main processors are connected via an inter-processor interface. Each of the main processors includes at least one pair of an expansion slot for installing a coprocessor and an expansion slot for installing an external interface card.

18 Claims, 12 Drawing Sheets ical Field

The present invention relates to a tightly coupled multiprocessor system configured by connecting a plurality of main processors via inter-processor interfaces, and a control method thereof.

BACKGROUND ART

In order to improve processing performance of a computer system, there has been an approach to implement a coprocessor as hardware which executes operation specialized in a particular filed at a high speed, besides a processor governing the main processing. As an example of such a coprocessor, a GPGPU (General Purpose Graphic Processing Unit) has been known. A GPGPU is a unit in which a GPU for graphic is adapted to be used for general-purpose numerical calculation. Typical products thereof include Tesla (registered trademark, NVIDIA Corp.) and Radeon (registered trademark, AMD Inc.). In general, a GPGPU is not usable alone, and is used in combination with a CPU (Central Processing Unit) without fail. More specifically, data is once loaded to a main memory from an external device, then a CPU starts processing, and a part of the processing is off-loaded to a GPGPU. The data processed by the GPGPU is stored in the main memory again. However, when data from the external device is transferred to the GPGPS via the main memory, the overhead at the time of data transfer becomes large.

As such, JP 2010-272066 A (Patent Document 1) discloses an example of a tightly coupled multiprocessor system in which the overhead for data exchange between an external device and a coprocessor such as a GPGPU is reduced. The tightly coupled multiprocessor system disclosed in Patent Document 1 includes a main processor having a plurality of processor cores, a main memory, an input/output interface circuit for performing connection with an external device, and a processor element (see FIG. 1 of Patent Document 1, for example).

The processor cores included in the main processor are connected via an internal bus or a crossbar switch. Further, the main processor is connected with the main memory via a memory bus, and is connected with the input/output interface circuit and the processor element via external interfaces such as PCI Express.

The processor element is a coprocessor which operates by instructions from the processor cores. The processor element includes a local memory for processing a large quantity of data. The local memory is directly accessible from the processor element and each processor core. Further, the local memory is able to perform DMA (Direct Memory Access) transfer of a large amount of data with the input/output interface circuit which allows connection with an external device.

In Patent Document 1, in order to further improve the operational performance, a plurality of processor elements are connected with the main processor via an external interface (see FIG. 3 of Patent Document 1, for example). Patent Document 1: JP 2010-272066 A As described in Patent Document 1, by directly transferring data between the local memory of a coprocessor such as a GPGPU and an input/output interface circuit used for connection with an external device without using a main memory, it is possible to reduce the latency of data transfer between the external device and the local memory of the coprocessor.

However, in the case of increasing the number of pieces of coprocessors in order to improve the performance, a sufficient improvement in performance cannot be expected by simply increasing the number of coprocessors as described in FIG. 3 of Patent Document 1. This is because as the coprocessors share the same input/output interface circuit, the transfer rate at each coprocessor becomes low.

SUMMARY

An exemplary object of the present invention is to provide a tightly coupled multiprocessor system which solves the above-described problem, that is, a problem that a sufficient improvement in performance cannot be expected by simply increasing the number of coprocessors.

A tightly coupled multiprocessor system, according to a first aspect of the present invention, is a tightly coupled multiprocessor system including a plurality of main processors connected via an inter-processor interface, in which each of the main processors includes at least one pair of an expansion slot for installing a coprocessor and an expansion slot for installing an external interface card.

Further, a method of controlling a tightly coupled multiprocessor system, according to a second aspect of the present invention, is a method of controlling a tightly coupled multiprocessor system including a first main processor and a second main processor, the first main processor including a first expansion slot for installing a coprocessor and a first expansion slot for installing an external interface card, the second main processor being connected with the first main processor via an inter-processor interface and including a second expansion slot for installing a coprocessor and a second expansion slot for installing an external interface card.

The method includes allowing to perform first data transfer by the DMA method between a first coprocessor connected to the first expansion slot for installing a coprocessor, and a first external device connected to a first external interface card connected to the first expansion slot for installing an external interface card; and allowing to perform second data transfer by the DMA method between a second coprocessor connected to the second expansion slot for installing a coprocessor, and a second external device connected to a second external interface card connected to the second expansion slot for installing an external interface card.

With the above-described configuration, the present invention is able to expand the function of the computer system by paring an input/output interface card, which allows connection with an external device, and a coprocessor. As such, in the case where the number of coprocessors is increased, the input/output interface card which allows connection with an external device is not shared by multiple

EXEMPLARY EMBODIMENTS

Next, exemplary embodiments of the present invention will be described in detail with reference to the drawings.

First Exemplary Embodiment

Figure 1:
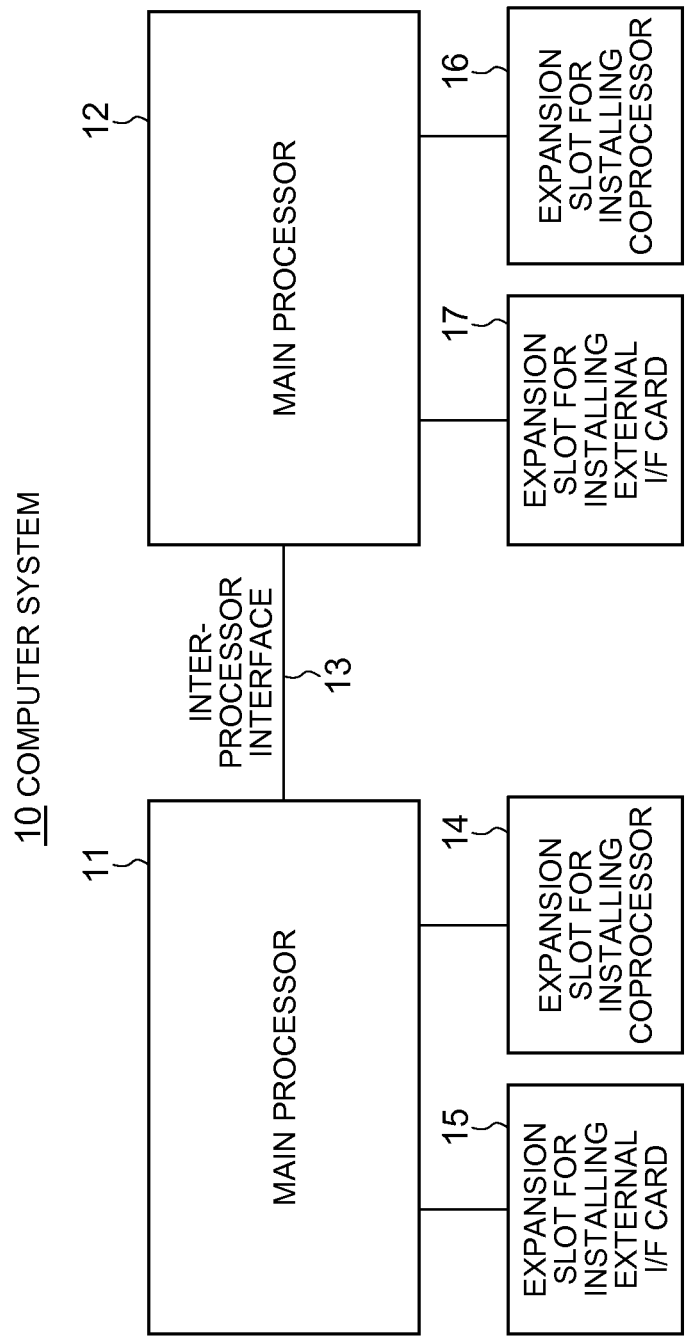
FIG. 1 is a block diagram showing a computer system according to a first exemplary embodiment of the present invention.

Referring to FIG. 1, a computer system 10 according to a first exemplary embodiment is a tightly coupled multiprocessor system in which a main processor 11 and a main processor 12 are connected via an inter-processor interface 13.

The main processors 11 and 12 are processors governing the main processing of the computer system 10. One main processor 11 includes an expansion slot 14 for installing a coprocessor, and an expansion slot 15 for installing an external interface card. The other main processor 12 includes an expansion slot 16 for installing a coprocessor and an expansion slot 17 for installing an external interface card.

While the computer system 10 of the present embodiment is configured by connecting two main processors, the number of main processors to be connected is not limited to two and may be three or more.

Further, while the present embodiment is configured such that each main processor is equipped with only one pair of an expansion slot for installing a coprocessor and an expansion slot for installing an external interface card, each main processor may be equipped with two or more pairs of such expansion slots.

In the computer system 10 of the present embodiment, each of the main processors 11 and 12 includes a pair of expansion slot 14 or 16 for installing a coprocessor and an expansion slot 15 or 17 for installing an external interface card. As such, it is possible to expand the function of the computer system 10 by paring an input/output interface card, which allows connection with an external device, and a coprocessor. Accordingly, in the case where the number of coprocessors is increased, an input/output interface card which allows connection with an external device is not shared by multiple coprocessors, whereby it is expected that the performance of the computer system can be improved significantly.

Second Exemplary Embodiment

Figure 2:
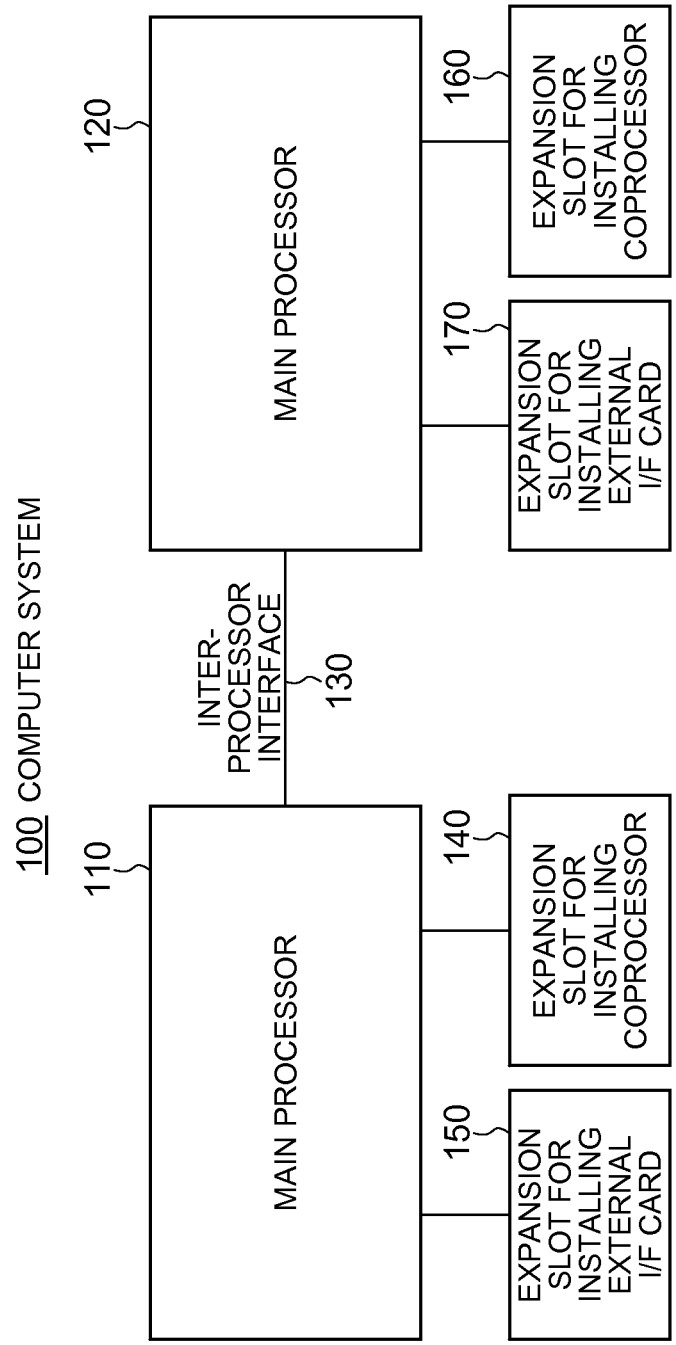
FIG. 2 is a block diagram showing a computer system according to a second exemplary embodiment of the present invention.

Referring to FIG. 2, a computer system 100 according to a second exemplary embodiment of the present invention is a tightly coupled multiprocessor system in which a main processor 110 and a main processor 120 are connected with each other via an inter-processor interface 130.

The main processors 110 and 120 are processors governing the main processing of the computer system 100. One main processor 110 includes an expansion slot 140 for installing a coprocessor, and an expansion slot 150 for installing an external interface card. The other main processor 120 includes an expansion slot 160 for installing a coprocessor, and an expansion slot 170 for installing an external interface card.

The main processor 110 and the expansion slots 140 and 150 are connected via external interfaces. Similarly, the main processor 120 and the expansion slot 160 and 170 are connected via external interfaces. The external interfaces may be of serial type such as PCI Express or Serial Rapid IO, or of parallel type such as PCI bus.

An expansion slot for installing an external interface card is an I/O (Input/Output) slot capable of connecting an external interface card physically and electrically to thereby incorporate the function of the external interface card, regardless of the slot being exclusive to an external interface card. An expansion slot for installing an external interface card is configured of a connector (female connector) for physically and electrically connecting a connector (male connector) of an external interface card, and a space for connecting the external interface card. To the external interface card, a cable to be linked with an external switch or a device is connected, as it is named. For example, in the case of a network interface control card of the Ethernet, an Ethernet cable is connected. Further, in the case of a host channel adapter (HCA) of the InfiniBand, an InfiniBand cable is connected. As such, an expansion slot, in which a connection cable of an external interface card is unlikely to be used in a state where the external interface card is connected, cannot be a slot for installing an external interface card. For example, in a server computer of rack-mount type, when an external interface card is connected to a connector (female connector) for an expansion slot, if the connector for connecting a connection cable provided on the external interface card contacts (faces) the front side or the rear side of the server casing, the expansion slot can be used as an expansion slot for installing an external interface card. On the other hand, when an external interface card is connected to a connector (female connector) for an expansion slot, if the connector for connecting a connection cable provided on the external interface card does not contact (does not face) the front side or the rear side of the server casing, it is unlikely to connect the connection cable with an external device, so that the expansion slot is not for installing an external interface card.

Further, an expansion slot for installing a coprocessor is an I/O slot capable of physically and electrically connecting a coprocessor to thereby integrate the function of the coprocessor in the system, regardless of the slot being exclusive for a coprocessor. An expansion slot for installing a coprocessor is configured of a connector (female connector) for physically and electrically connecting a connector (male connector) of a coprocessor side, and a space for connecting the coprocessor. As a coprocessor is not connected with a cable linking to the outside generally, which is different from the case of an external interface card, there is no restriction in the installment location due to connection of a cable. However, as a coprocessor is generally larger in height, width, and depth compared with an external interface card, a space sufficient for installing a coprocessor must be secured. Accordingly, as an expansion slot not having a sufficient empty space is unable to connect a coprocessor physically, such a slot cannot be a slot for installing a coprocessor. Further, when a coprocessor is connected to one of adjacent two expansion slots, there is a case where the connected coprocessor physically interferes so that the other expansion slot is sacrificed (cannot be used). Such expansion slots are needed to be handled as one expansion slot for installing a coprocessor as a whole, or as two expansion slots for installing external interface cards.

As described above, in the computer system 100 of the present embodiment, the main processor 110 has a pair of the expansion slot 140 for installing a coprocessor and the expansion slot 150 for installing an external interface card, and also, the main processor 120 has a pair of the expansion slot 160 for installing a coprocessor and the expansion slot 170 for installing an external interface card. As such, it is possible to expand the function of the computer system by paring an input/output interface card which allows connection of an external device, and a coprocessor.

Figure 3:
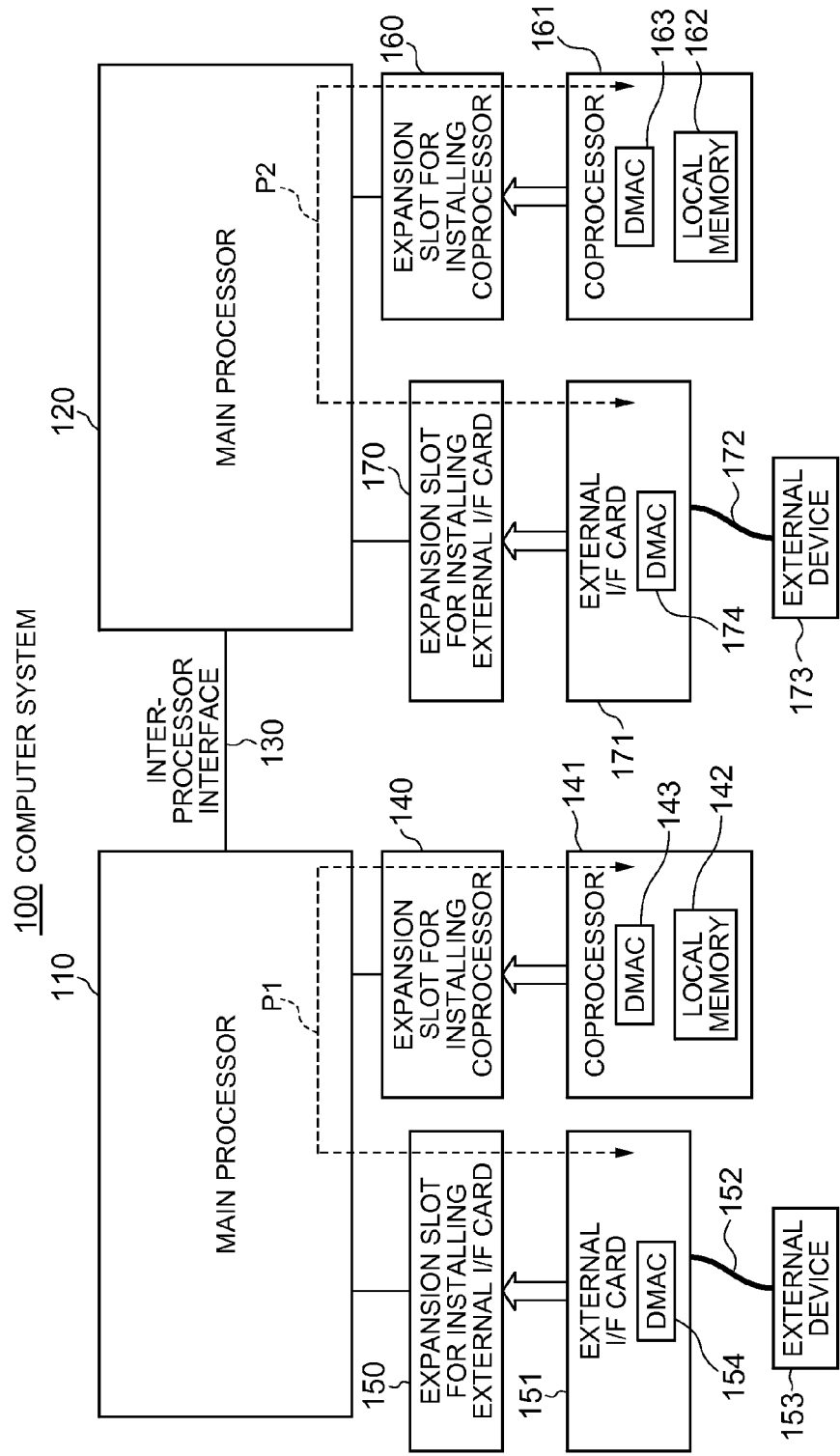
FIG. 3 is a block diagram showing the computer system with expanded functions according to the second exemplary embodiment of the present invention.

FIG. 3 shows the configuration of the computer system 100 with the expanded functions. In FIG. 3, a coprocessor 141 is connected to the expansion slot 140 for installing a coprocessor of the main processor 110, and to the expansion slot 150 for installing an external interface card of the same main processor 110, an external interface card 151, to be used in combination with the coprocessor 141, is connected. Further, an external device 153 is connected via a connection cable 152 of the external interface card 151. Meanwhile, a coprocessor 161 is connected to the expansion slot 160 for installing a coprocessor of the main processor 120, and to the expansion slot 170 for installing an external interface card of the same main processor 120, an external interface card 171, to be used in combination with the coprocessor 161, is connected. Further, an external device 173 is connected via a connection cable 172 of the external interface card 171.

The coprocessors 141 and 161 include local memories 142 and 162 for processing a large quantity of data, and DMACs (Direct Memory Access Controller) 143 and 163. The external interface cards 151 and 171 include DMACs 154 and 174. As the coprocessors 141 and 161, Intel's MICs (Many Integrated Core) may be used. A MIC is able to execute instructions which are the same as those executed by a CPU (Xeon (Registered Trademark)), different from a GPGPU which only operates according to limited instructions, and is also able to execute main routines. As such, different from a GPGPU which can only be used as an accelerator of a CPU, a MIC can be used as a small-scale CPU core. Further, a MIC has a local memory, and DMA transfer can be performed to the local memory from the outside. However, a coprocessor to be used in the present invention is not limited to a coprocessor of the type such as a MIC, but may be a coprocessor of the type which operates according to instructions from a CPU such as a GPGPU or a processor element disclosed in Patent Document 1.

The local memory 142 of the coprocessor 141 is directly accessible from the coprocessor 141 through read instructions, write instruction, and the like, and as shown by an arrow P1 of FIG. 2, the local memory 142 is also directly accessible from the external interface card 151 by the DMA method via an internal bus, a crossbar switch, or the like, not shown, in the main processor 110. The DMA transfer can be performed by using either a DMAC 143 or a DMAC 154. It is also possible to control the DMA transfer by using a DMAC, not shown, included in the main processor 110.

The local memory 162 of the coprocessor 161 is directly accessible from the coprocessor 161 through read instructions, write instructions, and the like, and as shown by an arrow P2 of FIG. 2, the local memory 162 is also directly accessible from the external interface card 171 by the DMA method via an internal bus, a crossbar switch, or the like, not shown, in the main processor 120. The DMA transfer can be performed by using either a DMAC 163 or a DMAC 174. It is also possible to control the DMA transfer by using a DMAC, not shown, included in the main processor 120.

The above-described two kinds of DMA transfer can be performed in parallel. As such, an operation of transferring a large quantity of data, which should be processed by the coprocessor 141, from the external device 153 to the local memory 142 via the external interface card 151, and an operation of transferring a large quantity of data, which should be processed by the coprocessor 161, from the external device 173 to the local memory 162 via the external interface card 171, can be performed in parallel. The respective coprocessors 141 and 161 are able to perform arithmetic processing independently on the data stored in the respective local memories 142 and 162.

Further, an operation of transferring a large quantity of data, having been processed by the coprocessor 141, from the local memory 142 to the external device 153 via the external interface card 151, and an operation of transferring a large quantity of data, having been processed by the coprocessor 161, from the local memory 162 to the external device 173 via the external interface card 171, can be performed in parallel.

Figure 9:
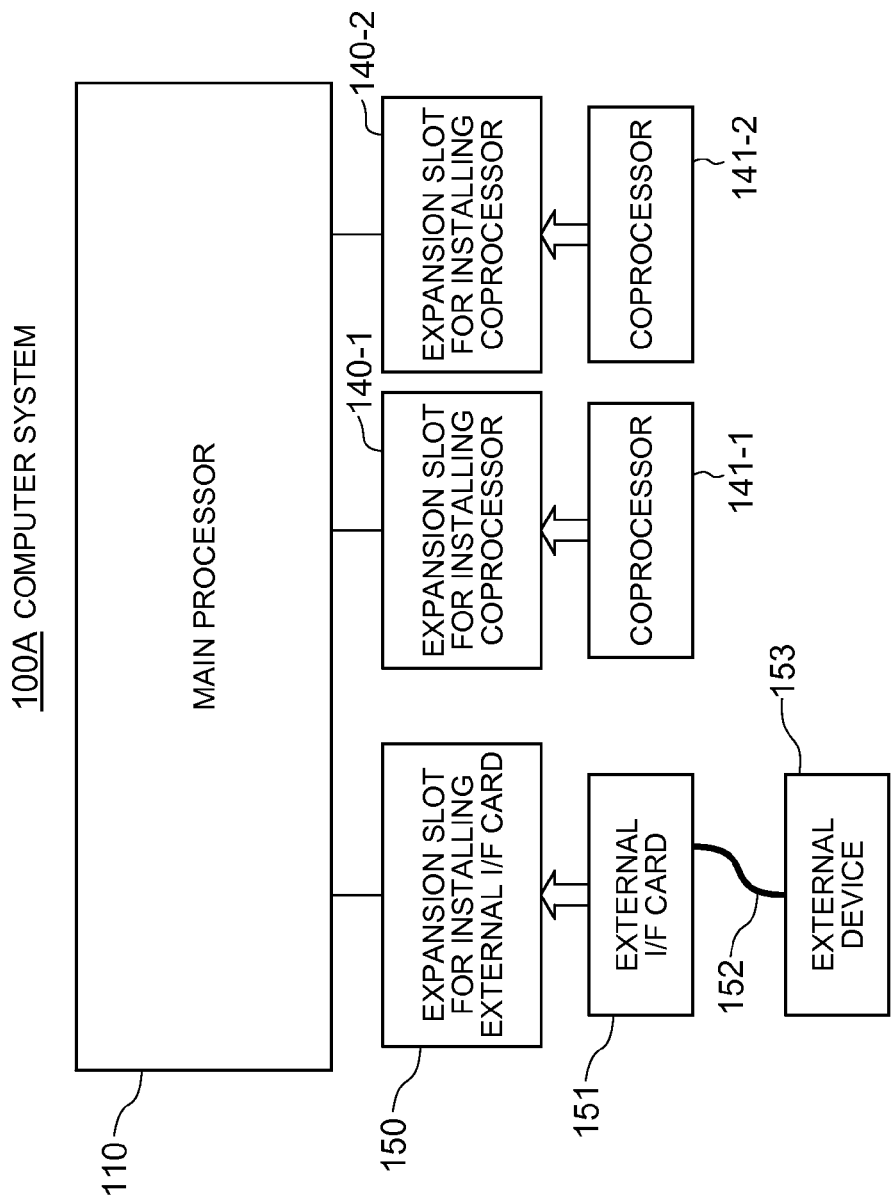
FIG. 9 is a block diagram showing a computer system related to the present invention.

In contrast, like a computer system 100A shown in FIG. 9, in a configuration in which one main processor 110 includes two expansion slots 140 for installing coprocessors and one expansion slot 150 for installing an external interface card, the input/output interface card 151 which allows connection with the external device 153 must be shared by multiple coprocessors 141. As such, if data transfer between the I/O interface card 151 for connection with the external device 153 and the respective coprocessors 141 is performed in parallel, there is a problem that the transfer performance cannot be achieved sufficiently for the respective coprocessors.

Figure 10:
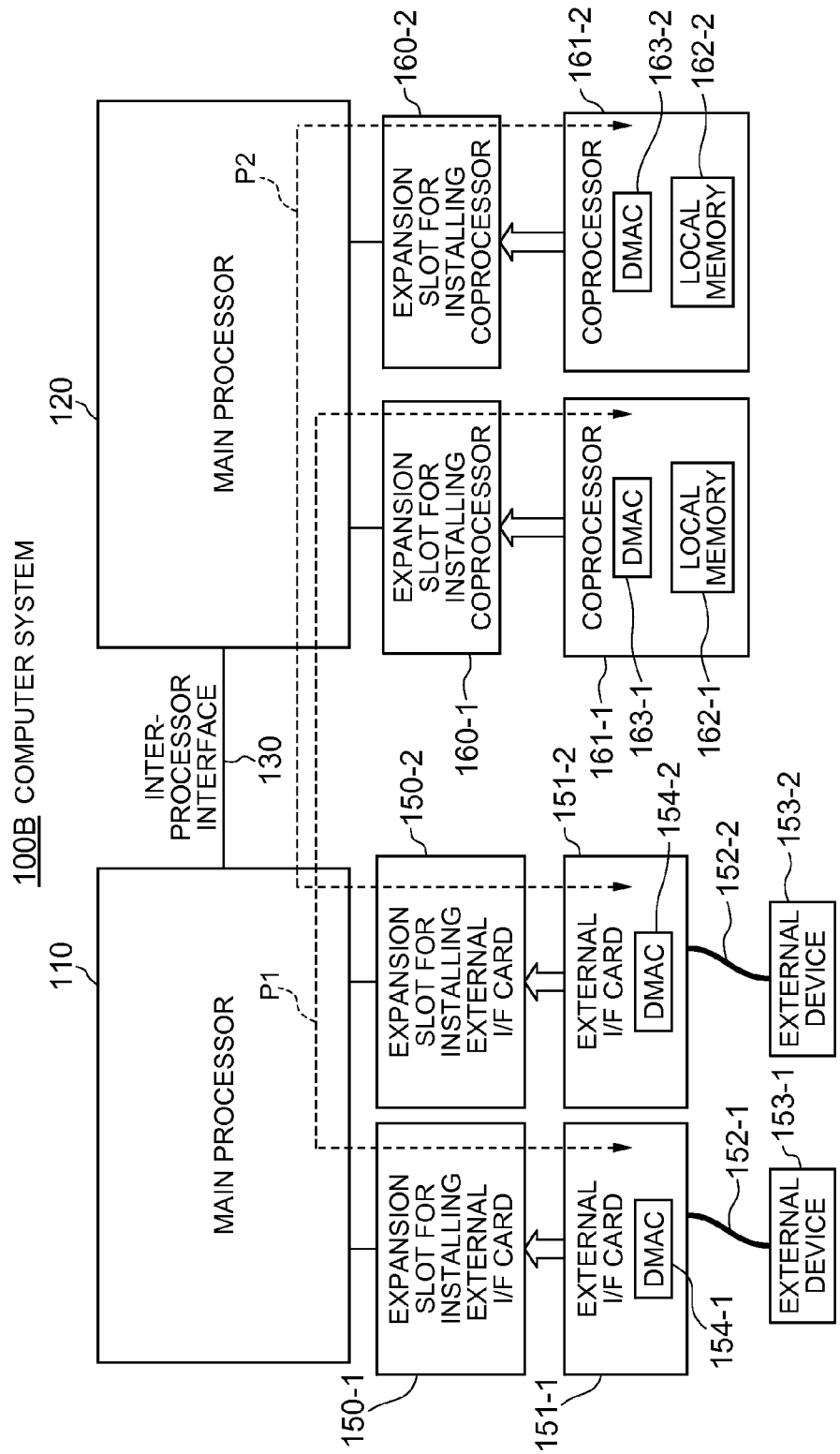
FIG. 10 is a block diagram showing another computer system related to the present invention.

Meanwhile, like a computer system 100B shown in FIG. 10, in a configuration in which one main processor 110 includes two expansion slots 150 for installing external interface cards and the other main processor 120 includes two expansion slots 160 for installing coprocessors, if data transfer is performed between the external interface card 151 and the coprocessor 161, the data transfer must be performed via the inter-processor interface 130 as shown by arrows P1 and P2 of FIG. 10. As such, the inter-processor interface 130 becomes the bottleneck on the throughput, whereby the latency of the data transfer becomes worse. However, in the computer system 100 of the present embodiment as shown in FIGS. 2 and 3, as data transfer is performed through the paths shown by the arrows P1 and P2 of FIG. 2, it is possible to prevent the latency from becoming worse due to the path via the inter-processor interface 130.

While the computer system 100 of the present embodiment is configured by connecting two main processors, the number of main processors to be connected is not limited to two, and may be three or more.

Further, while the present embodiment is configured such that each main processor includes only one pair of an expansion slot for installing a coprocessor and an expansion slot for installing an external interface card, it is also possible to include two or more pairs thereof.

Next, advantageous effects of the present embodiment will be described. The computer system 100 of the present embodiment is configured such that each of the main processors 110 and 120 includes a pair of an expansion slot 140 or 160 for installing a coprocessor and an expansion slot 150 or 170 for installing an external interface card. As such, the function of the computer system 100 can be expanded by paring the I/O interface card 151 or 171, which allows connection with the external device 153 or 173, and the coprocessor 141 or 161. Accordingly, even when the number of coprocessors is increased, there is no need to share the input/output interface card by multiple coprocessors, whereby significant improvement in the performance of the computer system can be expected.

Further, as the computer system 100 of the present embodiment performs DMA transfer between the coprocessors 141 and 161 connected to the expansion slots 140 and 160, and the external devices 153 and 173 connected, via the external interface cards 151 and 171, to the other expansion slots 150 and 170 provided to the main processors having the expansion slots 140 and 160, the latency will not be deteriorated, which is different from the case of DMA transfer performed via the inter-processor interface 130. Accordingly, the latency of data transfer when data of an external device is transferred to a local memory of a coprocessor which performs processing thereof, or when the processed data is transferred from the local memory of the coprocessor to the external device, can be improved.

Third Exemplary Embodiment

Figure 4:
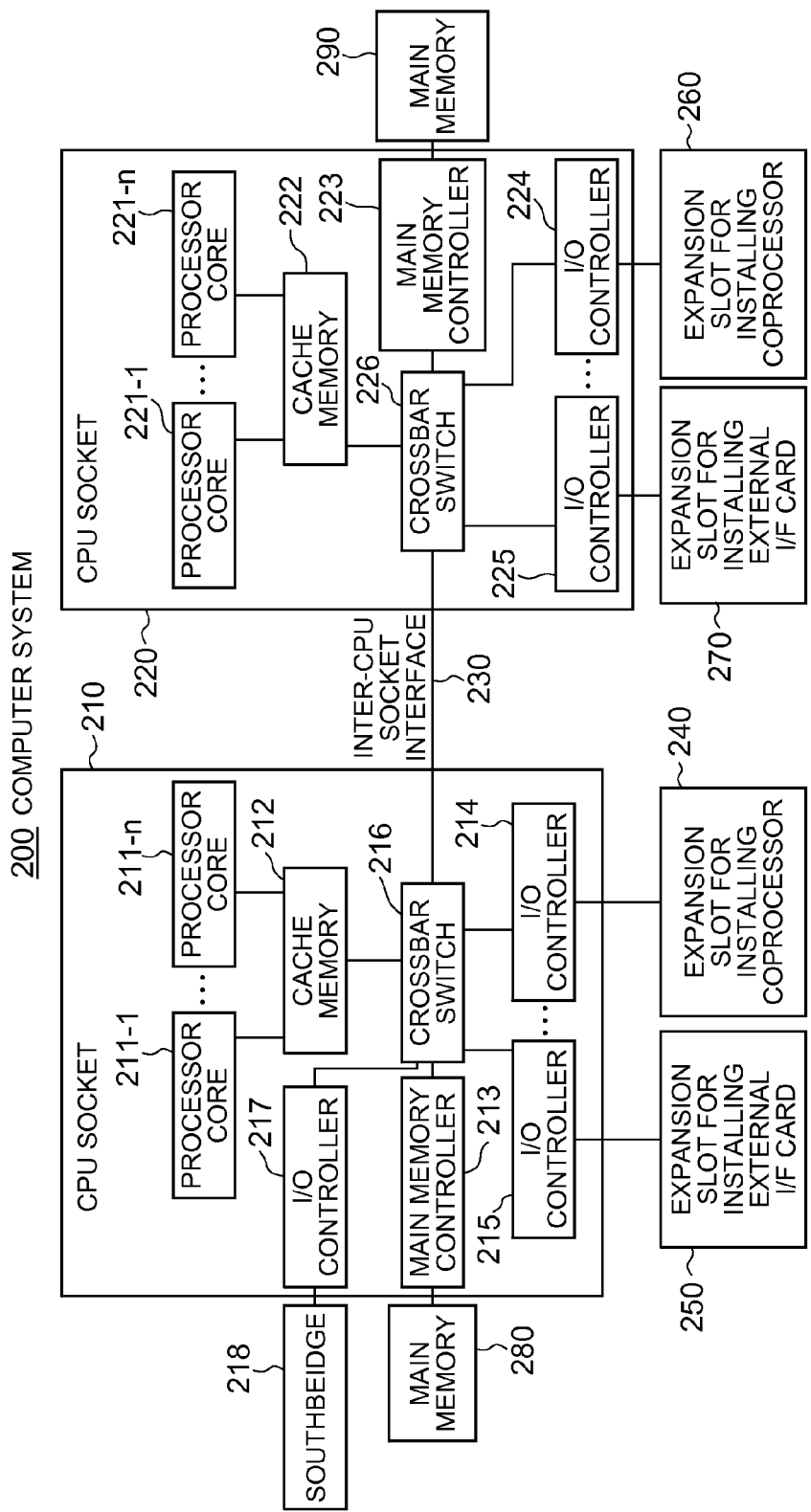
FIG. 4 is a block diagram showing a computer system according to a third exemplary embodiment of the present invention.

Referring to FIG. 4, a computer system 200 according to a third exemplary embodiment is a two-socket server computer including two CPU sockets namely a CPU socket 210 and a CPU socket 220.

The CPU socket 210 and the CPU socket 220 are connected via an inter-CPU socket interface 230. As the inter-CPU socket interface 230, QPI (QuickPath Interconnect) can be used, for example. However, the present invention is not limited to such a particular inter-CPU socket interface.

One CPU socket 210 includes one or a plurality of processor cores 211, a cache memory 212 connected with the processor core 211, a main memory controller 213, a plurality of I/O controllers 214 and 215, an I/O controller 217 for Southbridge, and a crossbar switch 216 connected with the cache memory 212, the main memory controller 213, the I/O controllers 214, 215, and 217, and an inter-CPU socket interface 230. To the main memory controller 213 of the CPU socket 210, a main memory 280 is connected via a memory bus, and to the I/O controller 217, Southbridge 218 is connected via an interface such as a DMI (Digital Media Interface). Further, to one I/O controller 214 of the CPU socket 210, an expansion slot 240 for installing a coprocessor is connected, and to the other I/O controller 215, an expansion slot 250 for installing an external interface card is connected. The Southbridge 218 is a chip constituting the computer system in combination with the CPU socket 210 (main processor), having an auxiliary function not held by the CPU socket 210. For example, there is a case where the CPU socket 210 uses the function of the Southbridge 218 to boot the computer system. It should be noted that the Southbridge 218 may be built in the CPU socket 210, or deleted. In any way, the CPU socket 210 is a CPU socket having a function to boot the computer system.

The other CPU socket 220 includes one or a plurality of processor cores 221, a cache memory 222 connected with the processor core 221, a main memory controller 223, a plurality of I/O controllers 224 and 225, and a crossbar switch 226 connected with the cache memory 222, the main memory controller 223, the I/O controllers 224 and 225, and an inter-CPU socket interface 230. To the main memory controller 223 of the CPU socket 220, a main memory 290 is connected via a memory bus. Further, to one I/O controller 224 of the CPU socket 220, an expansion slot 260 for installing a coprocessor is connected, and to the other I/O controller 225, an expansion slot 270 for installing an external interface card is connected.

The main memories 280 and 290 are DIMMs (Dual Inline Memory Module), for example. The processor cores 211 and 221 of the CPU sockets 210 and 222 are able to access the main memories 280 and 290 connected to the own CPU socket, and also able to access the main memories 290 and 280 connected to other CPU sockets via the inter-CPU socket interface 230. However, the access speed of the latter is lower than that of the former. This means that the computer system 200 adopts NUMA (Non-Uniform Memory Access) architecture.

Further, the computer system 200 has a PCI Express-compatible external interface. In PCI Express, one operational pair of transmission and reception is called a lane, and one link is configured of a variety of lanes such as 1 lane, 4 lanes, 8 lanes, and 16 lanes. Hereinafter, a link configured of N lanes is called an xN link.

Coprocessors such as a GPGPU and a MIC are generally compatible with an x16 link. On the other hand, almost all external interface cards such as Ethernet are compatible with an x4 link or an x8 link, and there is no external interface card compatible with an x16 link at this moment. However, if a coprocessor is compatible with an x16 link, and, as an external interface card to be used in a pair with the coprocessor, if only a card compatible with an x4 link or an x8 link can be added, it is difficult to sufficiently utilize the performance of the coprocessor. As such, in the present embodiment, in order to allow an external interface card compatible with an x16 link to be added, the number of lanes of the expansion slot for installing an external interface card is set to be 16. However, in the present invention, the number of lanes of the expansion slot is not limited to 16.

Figure 5:
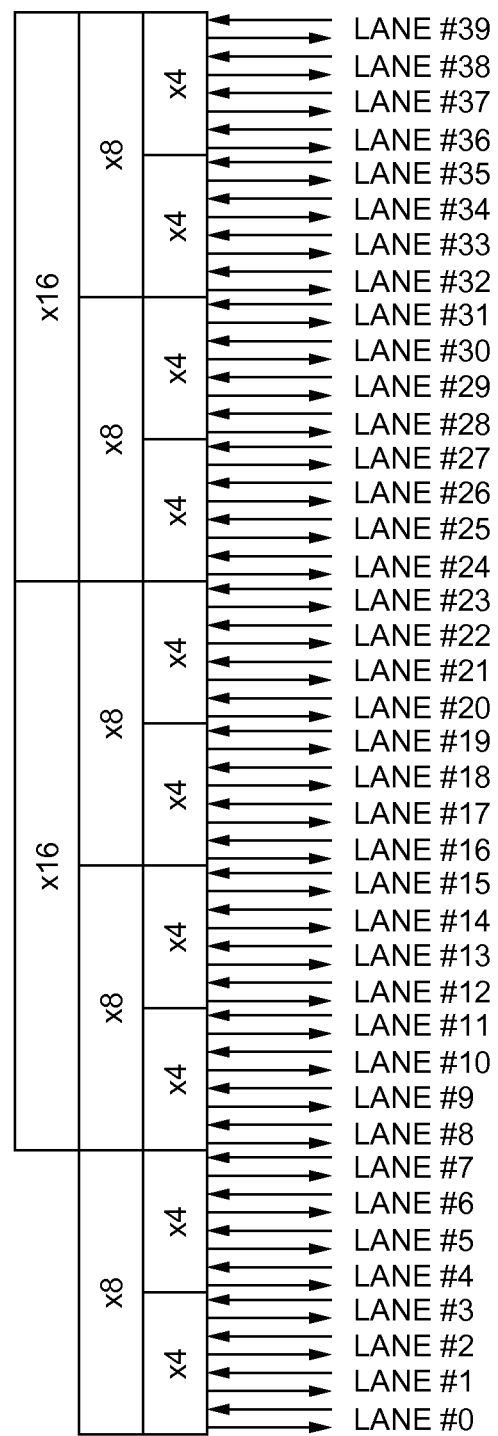
FIG. 5 is an illustration showing port setting processing of an I/O controller to be performed at the time of system startup by the computer system according to the third exemplary embodiment of the present invention.

FIG. 5 shows a relationship between the lanes of the external interface of the CPU socket 210 and the links. The CPU socket 210 has 40 lanes in total from a lane #0 to a lane #39. The CPU socket 210 can set the number of lanes of the I/O port statically at the time of startup of the system. For example, the CPU socket 210 can set such that adjacent four lanes operate as one I/O port of an x4 link. Further, the CPU socket 210 can combine two x4 links to set one I/O port of an x8 link, or combine two I/O ports of x8 links to set one I/O port of an x16 link. In the present embodiment, the CPU socket 210 generates two I/O ports of x16 links, and assigns one of the I/O ports to the I/O controller 214 which controls the expansion slot 240 for installing a coprocessor, and assigns the other one to the I/O controller 215 which controls the expansion slot 250 for installing an external interface card.

Similar to the CPU socket 210, the CPU socket 220 also has 40 lanes in total. The CPU socket 220 assigns one I/O port of an x16 link to the I/O controller 224 which controls the expansion slot 260 for installing a coprocessor, and assigns another I/O port of an x16 link to the expansion slot 270 for installing an external interface card. In the present embodiment, each of the CPU sockets 210 and 22 has 40 lanes in total. However, the present invention is not limited to the configuration in which the total number of lanes of an external interface provided to one CPU socket is 40. The number of lanes may be more or less, and the number of lanes of the respective CPU sockets may be different.

As described above, in the present embodiment, the expansion slots 240 and 260 for installing coprocessors and the expansion slots 250 and 270 for installing external interface cards are respectively connected to the I/O controllers 214 and 224 each having an I/O port of an x16 link. Accordingly, it is possible to expand the function of the computer system 200 by paring a coprocessor compatible with an x16 link and an external interface card compatible with an x16 link.

In general, when an external interface card compatible with an x4 link or x8 link is connected to an expansion slot compatible with an x16 link, the expansion slot operates as an x4 link or x8 link. As such, in the present embodiment, it can be said that it is possible to expand the function of the computer system 200 by paring a coprocessor compatible with an x16 link and an external interface card compatible with an x4 or x8 or x16 link.

Figure 6:
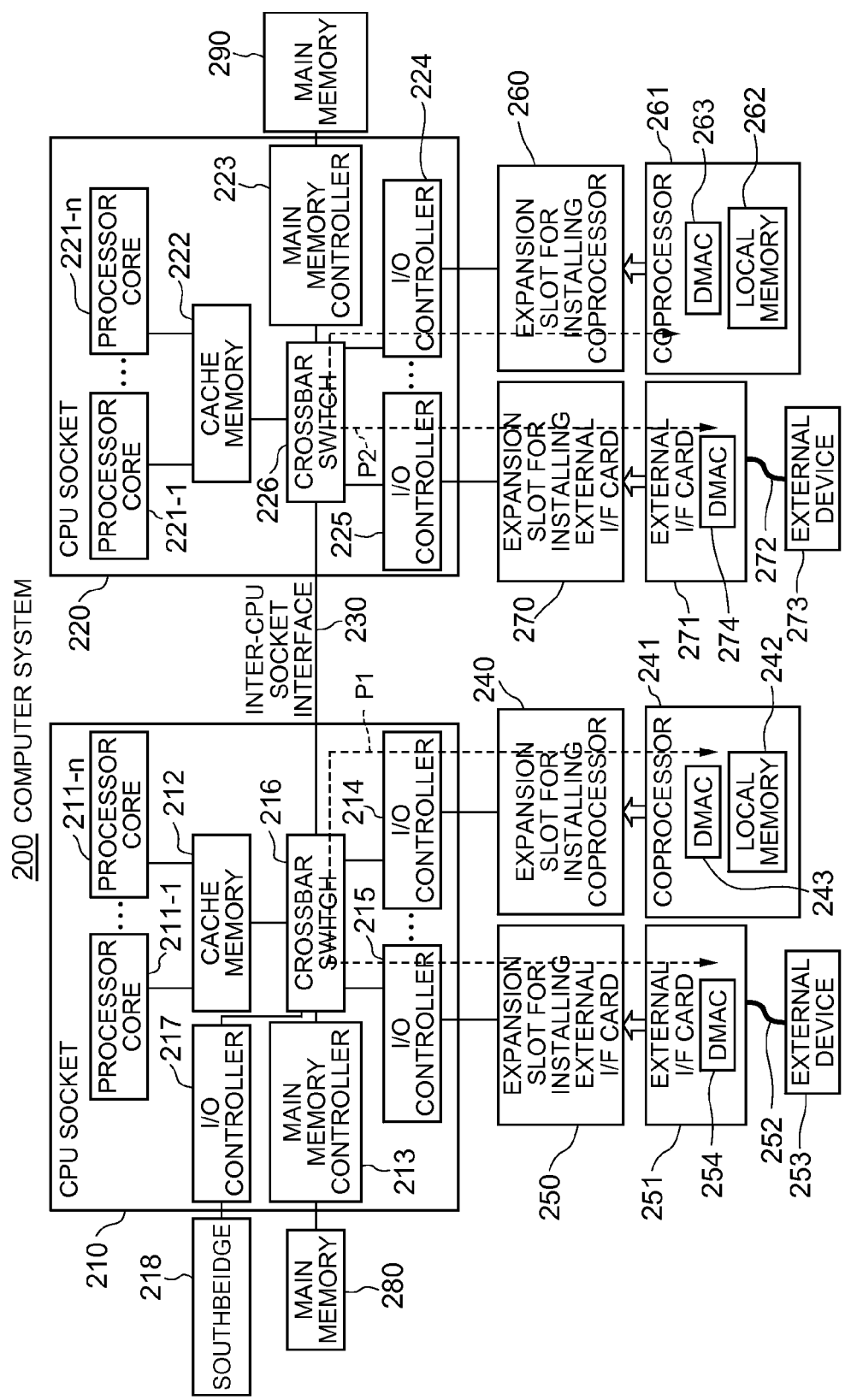
FIG. 6 is a block diagram showing the computer system with expanded functions according to the third exemplary embodiment of the present invention.

FIG. 6 shows a configuration of the computer system 200 with expanded functions. In FIG. 6, a coprocessor 241 compatible with an x16 link is connected to the expansion slot 240 for installing a coprocessor of the CPU socket 210, and an external interface card 251 compatible with an x16 link, to be used in combination with the coprocessor 241, is connected to the expansion slot 250 for installing an external interface card of the same CPU socket 210. Further, an external device 253 is connected via a connection cable 252 of the external interface card 251. On the other hand, a coprocessor 261 compatible with an x16 link is connected to the expansion slot 260 for installing a coprocessor of the CPU socket 220, and an external interface card 271 compatible with an x16 link, to be used in combination with the coprocessor 261, is connected to the expansion slot 270 for installing an external interface card of the same CPU socket 210. Further, an external device 273 is connected via a connection cable 272 of the external interface card 271.

The coprocessors 241 and 261 include local memories 242 and 262 and DMACs 243 and 263 for processing a large quantity of data. Further, the external interface cards 251 and 271 include DMACs 254 and 274.

The local memory 242 of the coprocessor 241 is directly accessible by read instructions, write instructions, and the like from the coprocessor 241, and as shown by an arrow P1 of FIG. 6, also directly accessible from the external interface card 251 via the I/O controllers 214 and 215 and the crossbar switch 216 in the CPU socket 210 by the DMA method. The DMA transfer can be performed by using either the DMAC 243 or DMAC 254. It is also possible to control the DMA transfer by using a DMAC, not shown, connected to the crossbar switch 216 of the CPU socket 210.

Further, the local memory 262 of the coprocessor 261 is directly accessible by read instructions, write instructions, and the like from the coprocessor 261, and as shown by an arrow P2 of FIG. 6, also directly accessible from the external interface card 271 via the I/O controllers 224 and 225 and the crossbar switch 226 in the main processor 220 by the DMA method. The DMA transfer can be performed by using either the DMAC 263 or DMAC 274. It is also possible to control the DMA transfer by using a DMAC, not shown, connected to the crossbar switch 226 of the CPU socket 220.

The above-described two types of DMA transfer can be performed in parallel. As such, an operation of transferring a large quantity of data, to be processed by the coprocessor 241, from the external device 253 to the local memory 242 via the external interface card 251, and an operation of transferring a large quantity of data, to be processed by the coprocessor 261, from the external device 273 to the local memory 262 via the external interface card 271, can be performed in parallel. The coprocessors 241 and 261 are able to perform arithmetic processing independently on the data stored in the local memories 242 and 262, respectively.

Further, an operation of transferring a large quantity of data, having been processed by the coprocessor 241, from the local memory 242 to the external device 253 via the external interface card 251, and an operation of transferring a large quantity of data, having been processed by the coprocessor 261, from the local memory 262 to the external device 273 via the external interface card 271, can be performed in parallel.

Figure 11:
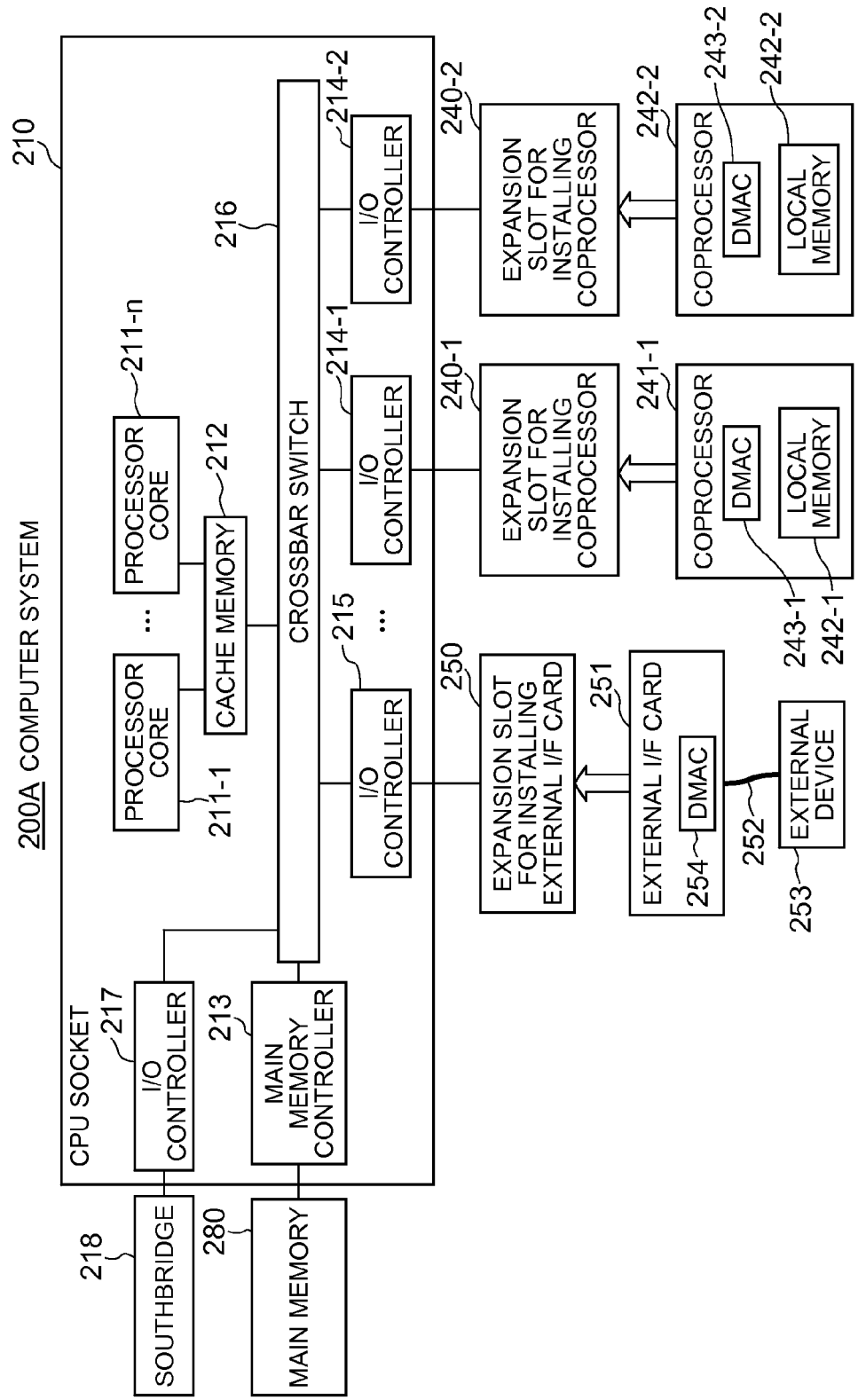
FIG. 11 is a block diagram showing yet another computer system related to the present invention.

On the other hand, like the computer system 200A as shown in FIG. 11, in the configuration in which one CPU socket 210 includes two expansion slots 240 for installing coprocessors and one expansion slot 250 for installing an external interface card, the input/output interface card 251 which allows connection with the external device 253 cannot be used simultaneously by multiple coprocessors 241. As such, if data transfer is performed in parallel between the input/output interface card 251, which allows connection with the external device 253, and the coprocessors 241, sufficient transfer performance cannot be achieved for each of the coprocessors.

Figure 12:
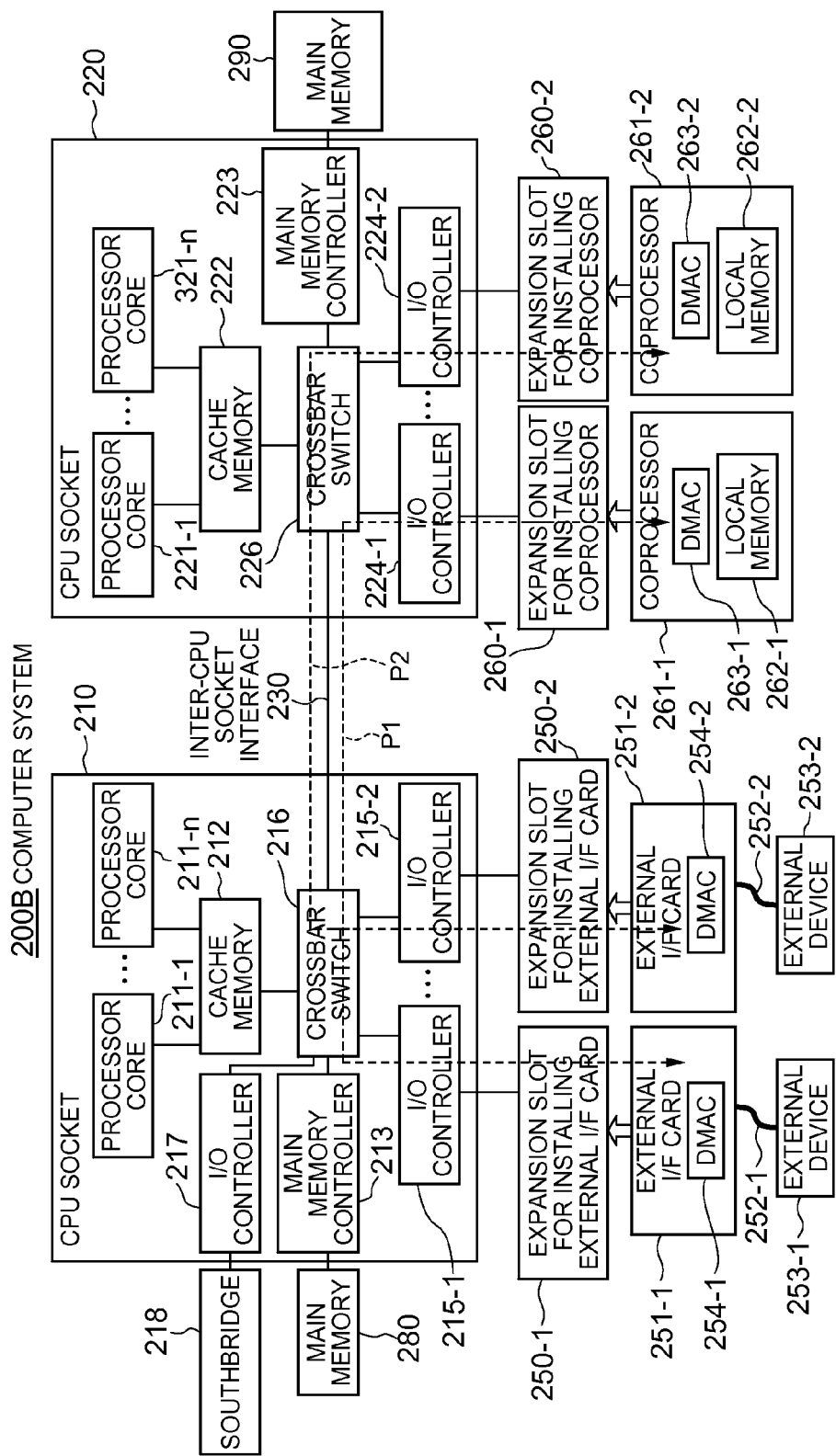
FIG. 12 is a block diagram showing yet another computer system related to the present invention.

Further, like the computer system 200B as shown in FIG. 12, in the configuration in which one CPU socket 210 includes two expansion slots 250 for installing external interface cards and the other CPU socket 220 includes two expansion slots 260 for installing coprocessors, if data transfer is performed between the external interface card 251 and the coprocessor 261, the transfer must be performed via the inter-CPU socket interface 230 as shown by arrows P1 and P2 of FIG. 12. As such, the inter-CPU socket interface 230 becomes the bottleneck on the throughput, whereby the latency of the data transfer becomes worse. On the contrary, in the computer system 200 of the present embodiment as shown in FIG. 6, data transfer is performed through the paths shown by the arrows P1 and P2 of FIG. 6. As such, it is possible to prevent the latency from becoming worse due to a path via the inter-processor interface 230.

While the computer system 200 of the present embodiment is configured by connecting two CPU sockets, the number of CPU sockets to be connected is not limited to two, and may be three or more.

Further, while, in the present embodiment, each CPU socket includes only one pair of an expansion slot for installing a coprocessor and an expansion slot for installing an external interface card, each CPU socket may include two or more pairs thereof.

Next, advantageous effects of the present embodiment will be described. The computer system 200 of the present embodiment is configured such that each of the CPU sockets 210 and 220 includes a pair of an expansion slot 240 or 260 for installing a coprocessor and an expansion slot 250 or 270 for installing an external interface card. As such, the function of the computer system 200 can be expanded by paring the input/output interface cards 251 and 271, which allow connection with the external devices 253 and 273, and the coprocessors 241 and 261. As such, even if the number of coprocessors is increased, an input/output interface card which allows connection with an external device is not shared by the multiple coprocessors, whereby a significant improvement in the performance of the computer system can be expected.

Further, the computer system 200 of the present embodiment performs DMA transfer between the coprocessors 241 and 261, connected to the expansion slots 240 and 260, and the external devices 253 and 273 connected, via the external interface cards 251 and 271, to the expansion slots 250 and 270 of the CPU socket which is the same as the CPU socket including the expansion slots 240 and 260. As such, it is possible to prevent the latency from becoming worse which may be cause by transfer performed via the inter-CPU socket interface 230. Accordingly, in the case of transferring data of an external device to a local memory of a coprocessor which processes the data, and transferring data, having been processed, from the local memory of the coprocessor to the external device, the latency can be improved.

Further, in the computer system 200 of the present embodiment, as the number of lanes of each of the expansion slots 250 and 270 for installing external interface cards is the same as the number of lanes of each of the expansion slots 240 and 260 for installing coprocessors which form pairs, an external interface card having the number of lanes which is the same as the number of lanes of the coprocessor can be added. Accordingly, it is possible to realize expansion of the function with which the performance of the coprocessor can be utilized sufficiently.

Fourth Exemplary Embodiment

Figure 7:
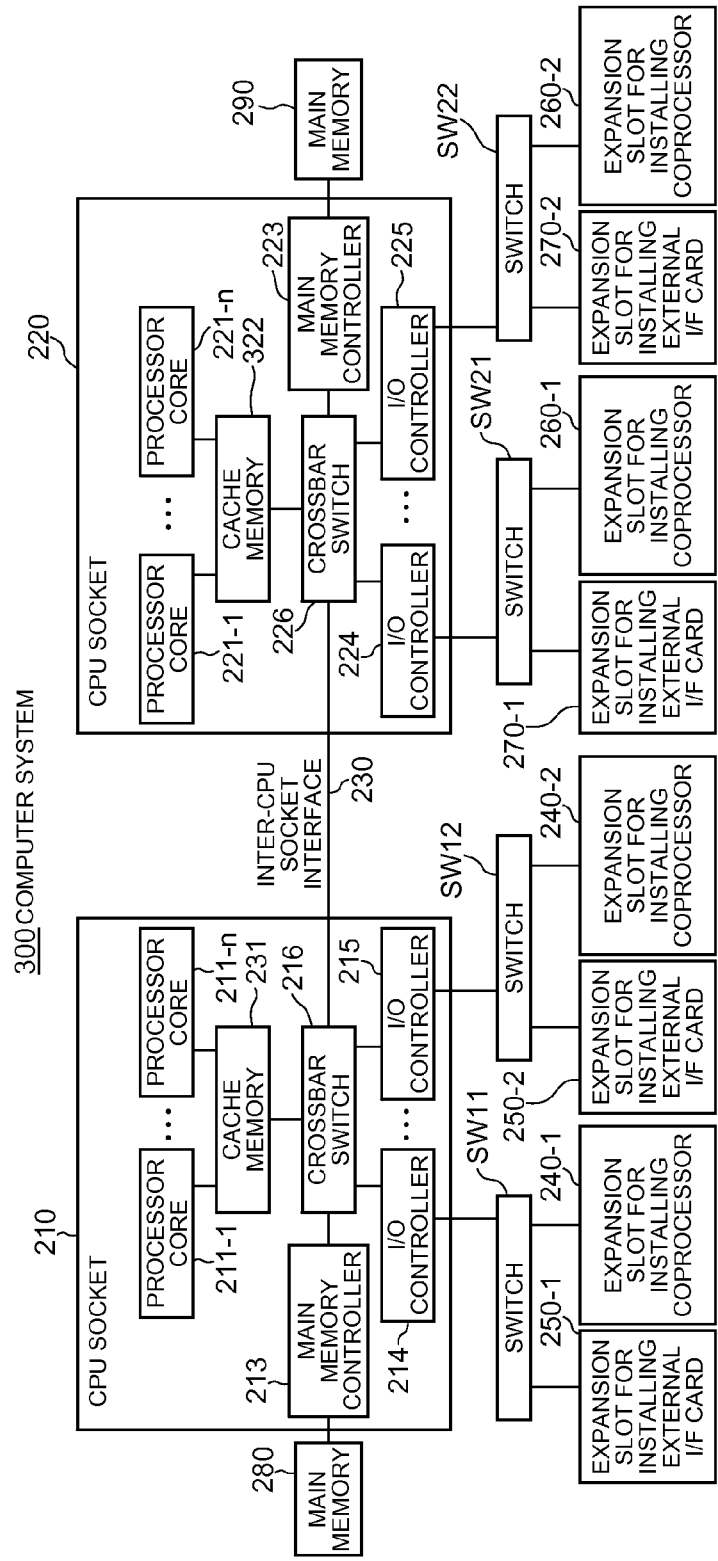
FIG. 7 is a block diagram showing a computer system according to a fourth exemplary embodiment of the present invention.

Referring to FIG. 7, a computer system 300 according to a fourth exemplary embodiment of the present invention is different from the computer system 200 according to the third exemplary embodiment of the present invention shown in FIG. 4 in that a pair of an expansion slot for installing a coprocessor and an expansion slot for installing an external interface card are connected to a CPI Express-compatible switch connected to the I/O controller of each CPU socket.

More specifically, the computer system 300 of the present embodiment is configured such that a PCI Express-compatible switch SW11 is connected to the I/O controller 214 of the CPU socket 210, and to the switch SW11, a pair of an expansion slot 240-1 for installing a coprocessor and an expansion slot 250-1 for installing an external interface card are connected. Further, to another I/O controller 215 of the same CPU socket 210, a CPI Express-compatible switch SW12 is connected, and to the switch SW12, another pair of an expansion slot 240-2 for installing a coprocessor and an expansion slot 250-2 for installing an external interface card are connected. While Southbridge is not connected to the CPU 210, which is different from FIG. 4, Southbridge may be connected.

Further, to the I/O controller 224 of the other CPU socket 220, a CPI Express-compatible switch SW21 is connected, and to the switch SW 21, a pair of an expansion slot 260-1 for installing a coprocessor and an expansion slot 270-1 for installing an external interface card are connected. Furthermore, to the other I/O controller 225 of the same CPU socket 220, a PCI Express-compatible switch SW22 is connected, and to the switch SW22, another pair of an expansion slot 260-2 for installing a coprocessor and an expansion slot 270-2 for installing an external interface card are connected.

Each of the switches SW11, SW12, SW21, and SW22 include one upstream port and a plurality of downstream ports. The number of lanes of the upstream port and the downstream port is 16. The upstream ports of the respective switches SW11, SW12, SW21, and SW22 are connected to the I/O controllers 214, 215, 224, and 225 of the CPU sockets, respectively. One of the downstream ports of the respective switches SW11, SW12, SW21, and SW22 are connected to the expansion slots 240-1, 240-2, 260-1, and 260-2 for installing coprocessors, respectively, and the other one of the downstream ports thereof are connected to the expansion slots 250-1, 250-2, 270-1, and 270-2 for installing external interface cards.

As described above, in the present embodiment, the expansion slots 240 and 260 for installing coprocessors and the expansion slots 250 and 270 for installing external interface cards are connected to the I/O controllers 214 and 224 having ports of an x16 link, via the switches SW11, SW12, SW21, and SW22 having upstream ports and downstream ports of an x16 link. Accordingly, the function of the computer system 300 can be expanded by paring the coprocessors compatible with an x16 link and an external interface card compatible with an x16 link.

Figure 8:
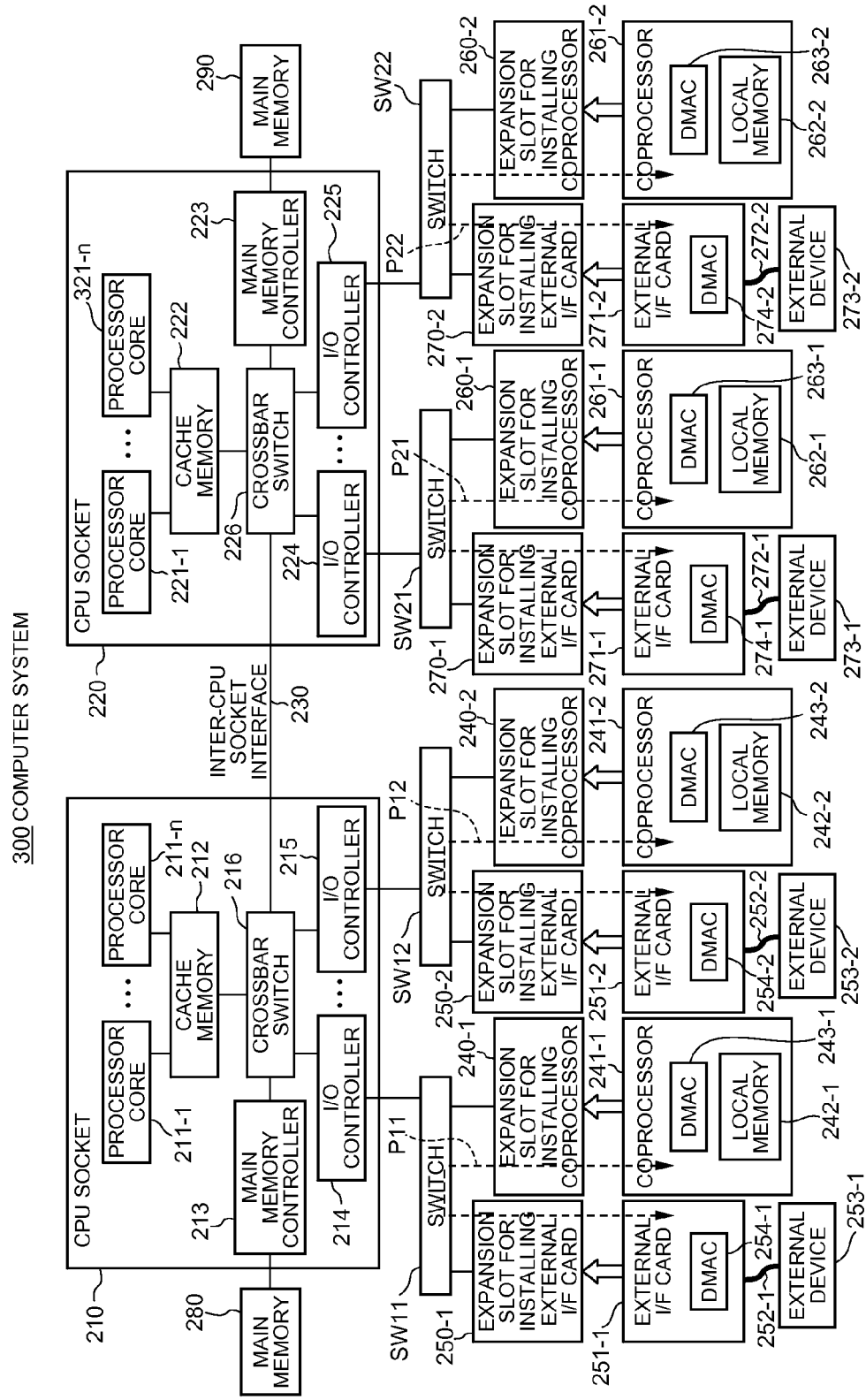
FIG. 8 is a block diagram showing the computer system with expanded functions according to the fourth exemplary embodiment of the present invention.

FIG. 8 shows a configuration of the computer system 300 with expanded functions. In FIG. 8, a coprocessor 241-1 compatible with an x16 link is connected to the expansion slot 240-1 for installing a coprocessor connected to one of the downstream ports of the switch SW11, and an external interface card 251-1 compatible with an x16 link, to be used in combination with the coprocessor 241-1, is connected to the expansion slot 250-1 for installing an external interface card connected to another downstream port of the same switch SW11. Further, an external device 253-1 is connected to a connection cable 252-1 of the external interface card 251-1.

Further, a coprocessor 241-2 compatible with an x16 link is connected to the expansion slot 240-2 for installing a coprocessor connected to one of the downstream ports of the switch SW12, and an external interface card 251-2 compatible with an x16 link, to be used in combination with the coprocessor 241-2, is connected to the expansion slot 250-2 for installing an external interface card connected to another downstream port of the same switch 12. Further, the external device 253-2 is connected to a connection cable 252-2 of the external interface card 251-2.

Further, a coprocessor 261-1 compatible with an x16 link is connected to the expansion slot 260-1 for installing a coprocessor connected to one of the downstream ports of the switch SW21, and an external interface card 271-1 compatible with an x16 link, to be used in combination with the coprocessor 261-1, is connected to the expansion slot 270-1 for installing an external interface card connected to another downstream port of the same switch SW21. Further, an external device 273-1 is connected to a connection cable 272-1 of the external interface card 271-1.

Further, a coprocessor 261-2 compatible with an x16 link is connected to the expansion slot 260-2 for installing a coprocessor connected to another downstream port of the switch SW22, and an external interface card 271-2 compatible with an x16 link, to be used in combination with the coprocessor 261-2, is connected to the expansion slot 270-2 for installing an external interface card connected to another downstream port of the same switch SW22. Further, an external device 273-3 is connected to a connection cable 272-2 of the external interface card 271-2.

The coprocessors 241-1, 241-2, 261-1, and 261-2 include local memories 242-1, 242-2, 262-1, and 262-2 for processing a large quantity of data, and DMA controllers 243-1, 243-2, 263-1, and 263-2. Further, the external interface cards 251-1, 251-2, 271-1, and 271-2 include DMA controllers 254-1, 254-2, 274-1, and 274-2.

The local memory 242-1 of the coprocessor 241-1 is directly accessible by read instructions, write instructions, and the like from the coprocessor 241-1, and as shown by an arrow P11 in FIG. 8, also directly accessible from the external interface card 251-1 via the switch SW11 by the DMA method. This DMA transfer can be performed using either the DMAC 243-1 or the DMAC 254-1.

Further, the local memory 242-2 of the coprocessor 241-2 is directly accessible by read instructions, write instructions, and the like from the coprocessor 241-2, and as shown by an arrow P12 in FIG. 8, also directly accessible from the external interface card 251-2 via the switch SW12 by the DMA method. This DMA transfer can be performed using either the DMAC 243-2 or the DMAC 254-2.

Further, the local memory 262-1 of the coprocessor 261-1 is directly accessible by read instructions, write instructions, and the like from the coprocessor 261-1, and as shown by an arrow P21 in FIG. 8, also directly accessible from the external interface card 271-1 via the switch SW21 by the DMA method. This DMA transfer can be performed using either the DMAC 263-1 or the DMAC 274-1.

Further, the local memory 262-2 of the coprocessor 261-2 is directly accessible by read instructions, write instructions, and the like from the coprocessor 261-2, and as shown by an arrow P22 in FIG. 8, also directly accessible from the external interface card 271-2 via the switch SW22 by the DMA method. This DMA transfer can be performed using either the DMAC 263-2 or the DMAC 274-2.

These four types of DMA transfer, described above, can be performed in parallel. As such, an operation of transferring a large quantity of data, which should be processed by the coprocessor 241-1, from the external device 253-1 to the local memory 242-1 via the external interface card 251-1, an operation of transferring a large quantity of data, which should be processed by the coprocessor 241-2, from the external device 253-2 to the local memory 242-2 via the external interface card 251-2, an operation of transferring a large quantity of data, which should be processed by the coprocessor 261-1, from the external device 273-1 to the local memory 262-1 via the external interface card 271-1, and an operation of transferring a large quantity of data, which should be processed by the coprocessor 261-2, from the external device 273-2 to the local memory 262-2 via the external interface card 271-2, can be performed in parallel. Respective coprocessors 241-1, 241-2, 261-1, and 261-2 are able to perform arithmetic processing independently on data stored in respective local memories 242-1, 242-2, 262-1, and 262-2.

Further, an operation of transferring a large quantity of data, having been processed by the coprocessor 241-1, from the local memory 242-1 to the external device 253-1 via the external interface card 251-1, an operation of transferring a large quantity of data, having been processed by the coprocessor 241-2, from the local memory 242-2 to the external device 253-2 via the external interface card 251-2, an operation of transferring a large quantity of data, having been processed by the coprocessor 261-1, from the local memory 262-1 to the external device 273-1 via the external interface card 271-1, and an operation of transferring a large quantity of data, having been processed by the coprocessor 261-2, from the local memory 262-2 to the external device 273-2 via the external interface card 271-2, can be performed in parallel.

While the computer system 300 according to the present embodiment is configured by connecting two CPU sockets, the number of CPU sockets to be connected is not limited to two, and may be three or more.

Further, while in the present embodiment each CPU socket is configured such that two PCI Express-compatible switches, each allowing connection of a pair of an expansion slot for installing a coprocessor and an expansion slot for installing an external interface card, are connected, the number of PCI Express-compatible switches which allow connection of such a pair is not limited to two. The number of such switches may be one, or the number of such pairs may be three or more.

Further, while the present embodiment is configured such that only one pair of an expansion slot for installing a coprocessor and an expansion slot for installing an external interface card are connected to one PCI Express-compatible switch, the number of pairs to be connected to one PCI Express-compatible switch is not limited to one, and may be two or more.

Next, advantageous effects of the present embodiment will be described. In the computer system 300 according to the present embodiment, each of the CPU sockets 210 and 220 includes a pair of an expansion slot 240 or 260 for installing a coprocessor and an expansion slot 250 or 270 for installing an external interface card. As such, it is possible to expand the function of the computer system 300 by paring the input/output interface cards 251 and 271, which allow connection with the external devices 253 and 273, and the coprocessors 241 and 261. Accordingly, even when the number of coprocessors is increased, there is no need to share an input/output interface card, which allows connection with an external device, by multiple coprocessors, whereby a significant improvement in the performance of the computer system can be expected.

Further, the computer system 300 of the present embodiment performs DMA transfer between the coprocessors 241 and 261 connected to the expansion slots 240 and 260, and the external devices 253 and 273 connected, via the external interface cards 251 and 271, to the expansion slots 250 and 270 connected to the switches SW11 to SW22 which are the same as the switches SW11 to SW22 to which the expansion slots 240 and 260 are connected, through paths which are returned at the switches. As such, deterioration in the latency due to a path via an inter-CPU socket interface 230 and deterioration in the latency due to a path via a CPU socket are not caused. Accordingly, in the case of transferring data of an external device to a local memory of a coprocessor which performs processing of such data, and also in the case of transferring processed data from the local memory of the coprocessor to the external device, the latency can be improved.

Further, in the computer system 300 of the present embodiment, the number of lanes of each of the expansion slots 250 and 270 for installing external interface cards are the same as the number of lanes of each of the expansion slots 240 and 260 for installing coprocessors. As such, it is possible to add an external interface card having the number of lanes which is the same as the number of lanes of the coprocessor. As such, it is possible to realize functionality expansion which can utilize the performance of the coprocessor sufficiently.

Further, in the computer system 300 of the present embodiment, as the number of lanes of PCI-Express is logically increased by the switches SW11, SW12, SW21, and SW22, an expansion slot having the number of lanes exceeding the number of lanes of the CPU socket can be provided for installing a coprocessor and for installing an external interface card.

INDUSTRIAL APPLICABILITY

The present invention is applicable to functionality expansion of a tightly coupled multiprocessor system configured by connecting a plurality of main processors via interprocessor interfaces, and in particular, to functionality expansion of a 2CPU socket server computer.

The invention claimed is:

1. A tightly coupled multiprocessor system comprising a plurality of main processors connected via an inter-processor interface, wherein
each of the main processors includes at least one pair of an expansion slot for installing a coprocessor and an expansion slot for installing an external interface card, wherein
the main processors includes a first main processor and a second main processor,
the first main processor is connected with a first main memory, a first expansion slot for installing a coprocessor, a first expansion slot for installing an external interface card, and the inter-processor interface,
the second main processor is connected with a second main memory, a second expansion slot for installing a coprocessor, a second expansion slot for installing an external interface card, and the inter-processor interface,
the first main processor includes:
  at least one first processor core;
  a first cache memory connected with the first processor core;
  a first main memory controller connected with the first main memory;
  a plurality of first input/output controllers connected with the first expansion slot for installing a coprocessor and the first expansion slot for installing an external interface card; and
  a first crossbar switch connected with the first cache memory, the first main memory controller, the first input/output controllers, and the inter-processor interface, and
the second main processor includes:
  at least one second processor core;
  a second cache memory connected with the second processor core;
  a second main memory controller connected with the second main memory;
  a plurality of second input/output controllers connected with the second expansion slot for installing a coprocessor and the second expansion slot for installing an external interface card; and
  a second crossbar switch connected with the second cache memory, the second main memory controller, the second input/output controllers, and the inter-processor interface.

2. The tightly coupled multiprocessor system, according to claim 1, wherein
the number of lanes of the expansion slot for installing a coprocessor and the number of lanes of the expansion slot for installing an external interface card are the same.

3. The tightly coupled multiprocessor system, according to claim 1, wherein
the expansion slot for installing a coprocessor and the expansion slot for installing an external interface card are slots compatible with PCI Express.

4. The tightly coupled multiprocessor system, according to claim 1, wherein
the number of lanes of the expansion slot for installing a coprocessor and the expansion slot for installing an external interface card is 16.

5. The tightly coupled multiprocessor system, according to claim 1, wherein
each of the main processors includes a first input/output controller to which the expansion slot for installing a coprocessor is connected, and a second input/output controller to which the expansion slot for installing an external interface card is connected.

6. The tightly coupled multiprocessor system, according to claim 5, wherein
DMA transfer is performed between a coprocessor connected to the expansion slot for installing a coprocessor, and an external device connected to an external interface card connected to the expansion slot for installing an external interface card, the expansion slot for installing an external interface card forming a pair with the expansion slot for installing a coprocessor.

7. The tightly coupled multiprocessor system, according to claim 1, wherein
the main processor includes a PCI Express-compatible switch in which the expansion slot for installing a coprocessor and the expansion slot for installing an external interface card, forming a pair with the expansion slot for installing a coprocessor, are connected to different downstream ports respectively.

8. The tightly coupled multiprocessor system, according to claim 7, wherein
the main processor includes an input/output controller connected to an upstream port of the switch.

9. The tightly coupled multiprocessor system, according to claim 7, wherein
DMA transfer is performed via the switch between a coprocessor connected to the expansion slot for installing a coprocessor, and an external device connected to an external interface card connected to the expansion slot for installing an external interface card, the expansion slot for installing an external interface card forming a pair with the expansion slot for installing a coprocessor.

10. The tightly coupled multiprocessor system, according to claim 6, wherein
the coprocessor is able to execute an instruction which is the same as an instruction to be executed by the main processor.

11. The tightly coupled multiprocessor system, according to claim 6, wherein
the coprocessor is able to execute a main routine.

12. A method of controlling a tightly coupled multiprocessor system including a first main processor and a second main processor, the first main processor including a first expansion slot for installing a coprocessor and a first expansion slot for installing an external interface card, the second main processor being connected with the first main processor via an inter-processor interface and including a second expansion slot for installing a coprocessor and a second expansion slot for installing an external interface card, the method comprising:
  allowing to perform first data transfer by a DMA method between a first coprocessor connected to the first expansion slot for installing a coprocessor, and a first external device connected to a first external interface card connected to the first expansion slot for installing an external interface card; and
    allowing to perform second data transfer by a DMA method between a second coprocessor connected to the second expansion slot for installing a coprocessor, and a second external device connected to a second external interface card connected to the second expansion slot for installing an external interface card, wherein
  the main processors includes a first main processor and a second main processor,
  the first main processor is connected with a first main memory, a first expansion slot for installing a coprocessor, a first expansion slot for installing an external interface card, and the inter-processor interface,
  the second main processor is connected with a second main memory, a second expansion slot for installing a coprocessor, a second expansion slot for installing an external interface card, and the inter-processor interface,
  the first main processor includes:
    at least one first processor core;
    a first cache memory connected with the first processor core;
    a first main memory controller connected with the first main memory;
    a plurality of first input/output controllers connected with the first expansion slot for installing a coprocessor and the first expansion slot for installing an external interface card; and
    a first crossbar switch connected with the first cache memory, the first main memory controller, the first input/output controllers, and the inter-processor interface, and
  the second main processor includes:
    at least one second processor core;
    a second cache memory connected with the second processor core;
    a second main memory controller connected with the second main memory;
    a plurality of second input/output controllers connected with the second expansion slot for installing a coprocessor and the second expansion slot for installing an external interface card; and
    a second crossbar switch connected with the second cache memory, the second main memory controller, the second input/output controllers, and the inter-processor interface.

13. The method of controlling the tightly coupled multiprocessor system, according to claim 12, wherein
  the first main processor includes a first input/output controller connected to the first expansion slot for installing a coprocessor, and a second input/output controller connected to the first expansion slot for installing an external interface card, and a first crossbar switch connected to the first input/output controller, the second input/output controller, and the inter-processor interface,
  the second main processor includes a third input/output controller connected to the second expansion slot for installing a coprocessor, a fourth input/output controller connected to the second expansion slot for installing an external interface card, and a second crossbar switch connected to the third input/output controller, the fourth input/output controller, and the inter-processor interface,
  the first data transfer is performed via the first input/output controller, the first crossbar switch, and the second input/output controller, and
  the second data transfer is performed via the third input/output controller, the second crossbar switch, and the fourth input/output controller.

14. The method of controlling the tightly coupled multiprocessor system, according to claim 12, wherein
  the first main processor includes a first PCI Express-compatible switch in which the first expansion slot for installing a coprocessor and the first expansion slot for installing an external interface card are connected to different downstream ports respectively, and an upstream port is connected to an input/output controller of the first main processor,
  the second main processor includes a second PCI Express-compatible switch in which the second expansion slot for installing a coprocessor and the second expansion slot for installing an external interface card are connected to different downstream ports respectively, and an upstream port is connected to an input/output controller of the second main processor,
  the first data transfer is performed via the first switch, and
  the second data transfer is performed via the second switch.

15. The method of controlling the tightly coupled multiprocessor system, according to claim 12, further comprising
  allowing to perform the first data transfer and the second data transfer in parallel.

16. A tightly coupled multiprocessor system comprising a plurality of main processors connected via an inter-processor interface, wherein
  each of the main processors includes at least one pair of an expansion slot for installing a coprocessor and an expansion slot for installing an external interface card, wherein
  the main processors includes a first main processor and a second main processor,
  the first main processor is connected with a first main memory, a plurality of first PCI Express-compatible switches, and the inter-processor interface,
  the second main processor is connected with a second main memory, a plurality of second PCI Express-compatible switches, and the inter-processor interface,
  the first main processor includes:
    at least one first processor core;
    a first cache memory connected with the first processor core;
    a first main memory controller connected with the first main memory;
    a plurality of first input/output controllers connected with the first switches; and
    a first crossbar switch connected with the first cache memory, the first main memory controller, the first input/output controllers, and the inter-processor interface,
  the second main processor includes:
    at least one second processor core;

a second cache memory connected with the second processor core;

a second main memory controller connected with the second main memory;

a plurality of second input/output controllers connected with the second switches; and a second crossbar switch connected with the second cache memory, the second main memory controller, the second input/output controllers, and the interprocessor interface, and each of the first switches and the second switches is connected with a pair of an expansion slot for installing a coprocessor and an expansion slot for installing an external interface card.

17. A data transfer method performed by the tightly coupled multiprocessor system according to claim 1, the method comprising:

connecting a first coprocessor to the first expansion slot for installing a coprocessor, connecting a first external device to the first expansion slot for installing an external interface card, connecting a second coprocessor to the second expansion slot for installing a coprocessor, and connecting a second external device to the second expansion slot for installing an external interface card, respectively;

performing data transfer between the first coprocessor and the first external device via the first input/output controllers and the first crossbar switch; and performing data transfer between the second coprocessor and the second external device via the second input/output controllers and the second crossbar switch.

18. A data transfer method performed by the tightly coupled multiprocessor system according to claim 16, the method comprising:

connecting a first coprocessor and a first external device to the first expansion slot for installing a coprocessor and the first expansion slot for installing an external interface card which are connected with the first switch;

connecting a second coprocessor and a second external device to the second expansion slot for installing a coprocessor and the second expansion slot for installing an external interface card which are connected with the second switch;

performing data transfer between the first coprocessor and the first external device which are connected with the first switch, via the first switch; and performing data transfer between the second coprocessor and the second external device which are connected with the second switch, via the second switch.

* * * * *